(12) United States Patent
Molesky et al.

(10) Patent No.: US 7,456,840 B2
(45) Date of Patent: Nov. 25, 2008

(54) DISPLAYING INFORMATION USING NODES IN A GRAPH

(75) Inventors: Lory Dean Molesky, Lexington, MA (US); Gopalan Arun, Nashua, NH (US); Carl J. Evankovich, Nashua, NH (US); David Mor, Merrimack, NH (US)

(73) Assignee: Oracle International Corporation, Redwood Shores, CA (US)

( * ) Notice: Subject to any disclaimer, the term of this patent is extended or adjusted under 35 U.S.C. 154(b) by 465 days.

(21) Appl. No.: 11/029,523

(22) Filed: Jan. 5, 2005

(65) Prior Publication Data

US 2006/0044319 A1    Mar. 2, 2006

Related U.S. Application Data

(60) Provisional application No. 60/605,823, filed on Aug. 31, 2004.

(51) Int. Cl.
*G09G 5/00* (2006.01)
*G06T 11/20* (2006.01)
*G06F 15/177* (2006.01)
*G06F 15/173* (2006.01)
*G06F 3/148* (2006.01)
*G06F 3/00* (2006.01)

(52) U.S. Cl. ............ 345/581; 345/440; 345/619; 709/220; 709/223; 715/713; 715/853

(58) Field of Classification Search ........... 715/502, 715/514, 526, 713, 764, 853–855, 227, 234, 715/248, 204, 700, 734–736, 781–788; 345/440–441, 345/581, 594, 619; 709/218, 220–223
See application file for complete search history.

(56) References Cited

U.S. PATENT DOCUMENTS

| | | | |
|---|---|---|---|
| 6,216,134 B1 * | 4/2001 | Heckerman et al. ...... | 707/104.1 |
| 6,396,810 B1 * | 5/2002 | Hebel ........................ | 370/248 |
| 2002/0016697 A1 * | 2/2002 | Nishigaki et al. ........... | 702/183 |
| 2004/0205726 A1 * | 10/2004 | Chedgey et al. ............. | 717/125 |
| 2005/0015396 A1 * | 1/2005 | Vu .............................. | 707/100 |
| 2005/0114795 A1 * | 5/2005 | Beaudoin .................... | 715/854 |
| 2006/0122771 A1 * | 6/2006 | Mikuriya et al. ............ | 701/210 |
| 2007/0094378 A1 * | 4/2007 | Baldwin et al. ............. | 709/223 |

OTHER PUBLICATIONS

"Business Process Management Visualization with ILOG JViews", Technical White Paper, BPM Visualization with ILOG JViews, 2004 ILOG, http://www.ilog.com.
Product Datasheet, "Java(TM) products for building advanced graphical displays", ILOG JViews, ILOG, http://www.ilog.com.
Product Datasheet, Inxight VizServer, www.inxight.com.
"SmartDiscovery and VizServer" from Inxight, Bloor Research, 2004 http://www.bloor-research.com.

\* cited by examiner

*Primary Examiner*—Wesner Sajous
(74) *Attorney, Agent, or Firm*—Gordon E Nelson

(57) ABSTRACT

Techniques for increasing the amount of information that may be displayed in a graph produced by a visualization system and simplifying the specification of the information. With regard to nodes of the graph, locations relative to the displayed node at which values of attributes of the displayed node are effective may be specified. 17 locations may be specified using values that indicate compass directions and whether the location is inside or outside the boundaries of the node. Among the attributes whose locations may be specified are content attributes whose values are strings or images and action attributes which specify actions that occur in response to mousing actions at the specified locations. Specification of attributes of nodes and also of links is simplified by the use of inheritance. Also disclosed are an API for setting and reading attributes and a technique for producing compressed representations of nodes at rendering time.

33 Claims, 19 Drawing Sheets

703 { public abstract NodeType createNodeType() 705 706

Create a node type with a generated id. 707
Returns:
　　the created node type —— 709

711 { public abstract NodeType createNodeType(NodeType nodeType)

Create a node type with a generated id and a parent node type.
Returns:
　　the created node type 713 { public abstract NodeType createNodeType(java.lang.Object nodeTypeId)

Create a node type with the given id.
Parameters:
　　nodeTypeId - the id of the new node type.
Returns:
　　the created node type 715 { public abstract NodeType createNodeType(java.lang.Object nodeTypeId,
　　　　　　　　　　　　　　　　　　　　　NodeType nodeType)

Create a node type with the given id and parent node type.
Parameters:
　　nodeTypeId - the id of the new node type.
　　nodeType - the parent node type.
Returns:
　　the created node type

803 { 
public abstract Node createNode()

Create a node with a generated id.
Returns:
   the created node

805 {
public abstract Node createNode(NodeType nodeType)

Create a node with a generated id and the node type.
Parameters:
   nodeType - the type of the node.
Returns:
   the created node 807 {
public abstract Node createNode(java.lang.Object nodeId)

Create a node with the given id.

Parameters:
   nodeId - the id of the node.
Returns:
   the created node

809 {
public abstract Node createNode(java.lang.Object nodeId,
          NodeType nodeType,
          java.awt.Image image)

Create a node with given image, id, and node type.
Parameters:
   nodeId - the id of the node.
   nodeType - the type of the node.
   image - the image of the node.
Returns:
   the created node

903 — public NodeDesc getNodeDesc(Node n)

Gets the node descriptor for a node. This object lets users customize
    properties for a specific node.
Parameters:
    n - the node to get the descriptor for.
Returns:
    the node descriptor object.

905 — public NodeDesc getNodeDesc(NodeType nodeType)

Gets the node descriptor for a node type. This object lets users customize
    properties for all nodes of that type.
Parameters:
    nodeType - the node type to get the descriptor for.
Returns:
    the node descriptor object.

907 — public NodeDesc getDefaultNodeDesc()

Get the NodeDesc for the default node type.
Returns:
    the default NodeDesc.

1003
```
public void setAttribute(ContentAttribute attribute,
            java.lang.Object value)
```
Sets the value of a node content attribute in LOCATION_CENTER.
Parameters:
    attribute - the attribute to set the value of.
    value - the value to set the attribute to.

1005
```
public void setAttribute(int location,
            boolean inside,
            ContentAttribute attribute,
            java.lang.Object value)
```
Sets the value of a node content attribute in a location.
Parameters:
    location - the location to set the attribute for.
    inside - whether the location is inside or outside the node.
    attribute - the attribute to set the value of.
    value - the value to set the attribute to.

1007
```
public void setAttribute(NodeAttribute attribute,
            java.lang.Object value)
```
Sets the value of the given node attribute.
Parameters:
    attribute - the attribute to set the value of.
    value - the value to set the attribute to.
See Also:
    NodeAttribute, NodeDesc

1303 {
```
public java.lang.Object getAttribute(ContentAttribute attribute)

Gets the value of a node content attribute in LOCATION_CENTER.

Parameters:
        attribute - the attribute to get the value of.
    Returns:
        the value of the attribute.
```

1305 {
```
public java.lang.Object getAttribute(int location,
                    boolean inside,
                    ContentAttribute attribute)

Gets the value of a content attribute in a location.

Parameters:
        location - the location to get the attribute for.
        inside - whether the location is inside or outside the node.
        attribute - the attribute to get the value of.
    Returns:
        the value of the attribute.
```

1301

1307 {
```
public ContentType getActiveNodeContent(int location,
                    boolean inside)

Returns which content type is the current active content type in a
    location. The active node content is which node content type is the current
    one that will be rendered.

Parameters:
        location - the location to get the active content for.
        inside - whether the location is inside or outside the node.
    Returns:
        the currenty active node content type
```

Fig. 13

```
public void setInteractionProperties(NodeDesc nodeD,
                     int location,
                     boolean inside,
                     InteractionProperties imProps)
```

Set interaction properties for a location on a node. These interaction properties are bundled inside an InteractionProperties object. They are set on a NodeDesc object given a location and whether the location is inside or outside the node. The interaction properties follow the defaulting mechanism of all location properties on a NodeDesc. There are variable substitutions that are done to the interaction properties to convey information to the application. They are described in the InteractionProperties class definition.

Parameters:
    nodeD - the NodeDesc object to set the properties on
    location - the location for the properties to be set on
    inside - whether the location is inside the node
    imProps - the InteractionProperties object containing the property
        values

1403

```
public void setInteractionProperties(NodeDesc nodeD,
                     InteractionProperties imProps)
```

Set interaction properties for an entire node. These interaction properties are bundled inside an InteractionProperties object. They are set on a NodeDesc object and they follow the defaulting mechanism of all NodeDesc properties. There are variable substitutions that are done to the interaction properties to convey information to the application. They are described in the InteractionProperties class definition.

Parameters:
    nodeD - the NodeDesc object to set the properties on
    imProps - the InteractionProperties object containing the property
        values

1503 {
```
public class InteractionProperties
extends java.lang.Object
```

This class contains interaction properties for image maps and SVG generation. These properties are used in ImageMapTopology and NavigateTopology to specify image maps and in SVGTopology to generate interaction code in SVG.

Interaction properties can have special strings in them that are replaced during generation of the resulting interaction code.
}

1505 {
```
public InteractionProperties(java.lang.String onMouseOut,
            java.lang.String onMouseOver,
            java.lang.String hRef,
            java.lang.String onClick,
            java.lang.String alt,
            java.lang.String title)
```

Constructs an InteractionProperties instance with all specified properties.

Parameters:
  onMouseOut - property for onMouseOut
  onMouseOver - property for onMouseOver
  hRef - property for hRef
  onClick - property for onClick
  alt - property for alt
  title - property for title
}

```
1603 InteractionProperties imProps = new InteractionProperties();

// create the image map properties to be set for nodes
1605     imProps.onClick = "javascript:clickedNode('$DATAID$');";
         imProps.alt = "$LABEL$";
         imProps.hRef = "#";

// since we want this set for all nodes,
         // we obtain the default node descriptor
1607     NodeDesc defNodeD =
             topology.getTopologyDesc().getDefaultNodeDesc();
         topology.setInteractionProperties(defNodeD, imProps);

1609 TopologyDataSource ds = graphComp.getDataSource();
1611 NodeType QueryGraphNodeType = ds.CreateNode_type();
1613 NodeDesc QueryGraphNodeDesc =
             graphComp.getNodeDesc(QueryGraphNodeType);

1616 Node thisNode = ds.createNode(QueryGraphNodeType);

1617 NodeDesc thisNodeDesc = graphComp.getNodeDesc(thisNode);

thisNodeDesc.setAttribute(OUTSIDE, NW, LABEL,
           String.valueof(thisNodeNo) + ")");
       thisNodeDesc.setAttribute(INSIDE, C, LABEL,
           thisNodeName);
1619   thisNodeDesc.setAttribute(INSIDE, S, IMAGE,
           PageImage);
       thisNodeDesc.setAttribute(OUTSIDE, S, GLYPH,
           GlyphMinus);
       thisNodeDesc.setAttribute(OUTSIDE, SE, LABEL,
           "Cost: " + String.valueof(thisNodeCost));

```
        // create a few node types
     ┌─ NodeType nodeType1 = ds.createNodeType(); // use sys-generated id
1803 ┤
     └─ NodeType nodeType2 = ds.createNodeType("my_Id");

┌─ // set some visualization properties about the node types
     │  NodeDesc nodeD = null;
1805 ┤
     │  Color mildBlue   = new Color(102, 153, 255);
     └─ Color lightPurple = new Color(255, 153, 255);

┌─ //
     │  // nodeType1: oval & blue background
     │  //
1807 ┤  nodeD = topComp.getNodeDesc(nodeType1);
     │  nodeD.setAttribute(NodeAttribute.BACKGROUNDCOLOR, mildBlue);
     └─ nodeD.setAttribute(NodeAttribute.SHAPE,NodeAttribute.SHAPE_OVAL);

┌─ //
     │  // nodeType2: red background
1809 ┤  //
     │  nodeD = topComp.getNodeDesc(nodeType2);
     └─ nodeD.setAttribute(NodeAttribute.BACKGROUNDCOLOR, lightPurple);

//
        // By default, all nodes are expanded.
        //
1811    ds.setDefaultExpandNode(true);

┌─ // add some nodes to the topology
     │  Node node1 = ds.createNode(nodeType1,"Node1");
     │  Node node2 = ds.createNode(nodeType1,"Node2");
     │  Node node3 = ds.createNode(nodeType1,"Node3");
1813 ┤  Node node4 = ds.createNode(nodeType2,"Node4");
     │  Node node5 = ds.createNode(nodeType2,"Node5");
     │  Node node6 = ds.createNode(nodeType2,"Node6");
     └─ Node node7 = ds.createNode(nodeType2,"Node7");

```
        // create some link types
1903  ┌──LinkType linkGroup1 = ds.createLinkType(); // use sys-generated id
      └──LinkType linkGroup2 = ds.createLinkType("MY_LINKGROUPID");

┌── //
      │   // Colors for links.
      │   //
1905 ─┤   Color darkBlue   = new Color(0, 0, 153);
      └── Color darkPurple = new Color(102, 0, 152);

// set some visualization properties about the link groups & types
  1907 LinkDesc linkD = null;

//
        // linkGroup1: thick blue links, with labels, no arrows
        //
      ┌── linkD = topComp.getLinkDesc(linkGroup1);
      │   linkD.setAttribute(LinkAttribute.LINKCOLOR, darkBlue);
      │   linkD.setAttribute(LinkAttribute.THICKNESS, new Integer(3));
1909 ─┤   linkD.setAttribute(LinkAttribute.DRAWARROW, Boolean.FALSE);
      │   linkD.setAttribute(LinkAttribute.DRAWLABEL, Boolean.TRUE);
      └── linkD.setAttribute(LinkAttribute.LABELROTATE, Boolean.TRUE);

//
        // linkGroup2: thin purple links, no labels, with arrows
        //
      ┌── linkD = topComp.getLinkDesc(linkGroup2);
1911 ─┤   linkD.setAttribute(LinkAttribute.LINKCOLOR, darkPurple);
      └── linkD.setAttribute(LinkAttribute.DRAWLABEL, Boolean.FALSE);

// create some link types
      ┌── LinkType linkType1 = ds.createLinkType(linkGroup1, "link1");
1913 ─┤   LinkType linkType2 = ds.createLinkType(linkGroup1, "link2");
      │   LinkType linkType3 = ds.createLinkType(linkGroup2);
      └── LinkType linkType4 = ds.createLinkType(linkGroup2);

┌── //
      │   // Individual links could be variations on a link group.
      │   //
1915 ─┤   // linkType4: variation of linkGroup2, without an arrowhead
      │   //
      │   linkD = topComp.getLinkDesc(linkType4);
      └── linkD.setAttribute(LinkAttribute.DRAWARROW, Boolean.FALSE);

┌── //
      │   // add a few links between them
      │   //
      │   ds.createLink(node1, node2, linkType1);
      │   ds.createLink(node1, node3, linkType2);
1917 ─┤   ds.createLink(node2, node4, linkType3);
      │   ds.createLink(node2, node5, linkType3);
      │   ds.createLink(node3, node6, linkType3);
      └── ds.createLink(node3, node7, linkType4);

1919 ds.setRoot(node1);

… # DISPLAYING INFORMATION USING NODES IN A GRAPH

CROSS REFERENCES TO RELATED APPLICATIONS

This patent application claims priority from U.S. Provisional patent application 60/605,823, Molesky, et al., Making and viewing nodes in a graph, filed Aug. 31, 2004. That application is incorporated herein by reference for all purposes.

BACKGROUND OF THE INVENTION

1. Field of the Invention

The invention relates generally to the visual display of information and more particularly to using graphs consisting of nodes and edges to display information.

2. Description of Related Art

Graphs: FIG. 1

One of the most useful ways of visually representing information is the graph. Mathematically, a graph is a set of nodes that may or may not be connected by arcs. The nodes represent entities and the arcs represent relationships between the entities. FIG. 1 shows an example graph 101 which represents a hierarchy consisting of the generic term textures and five specific textures. The hierarchy is represented by means of nodes 103 and arcs 107 connecting the nodes. Each node represents a term and the arcs indicate that nodes 103(2 . . . 7) represent species of the generic term represented by node 103(1). In the following discussion, the arcs will be termed links. Each node 103 has a label 105. The kind of relationship between the nodes shown in FIG. 101 is termed a tree 109, with node 103(1) being the root of the tree and nodes 103(2 . . . 7) being the leaves of the tree. Node 103(1) is further termed the parent of nodes 103(2 . . . 7) and those nodes are termed the children of node 103(1) and the siblings of each other. Of course, a node may have more than one level of descendants; if node 107(2), for example, has children, those children are grandchildren of node 103(1).

Visualization Systems: FIG. 2

If visual representations of information are to be useful for large bodies of information, there needs to be a way of automatically getting from the large body of information to the visual representation. Systems that do this task are termed visualization systems. Two currently available visualization systems are ILOG JViews, made by ILOG, Inc., Mountain View, Calif., and Inxight VizServer, made by Inxight Software, Inc., 500 Macara Avenue, Sunnyvale, Calif. 94085. FIG. 2 is a block diagram of ILOG JViews which is taken from ILOG, Inc's promotional materials. The block diagram is typical for any such visualization system. Visualization system 201 includes a source 205 for the data to be shown in the visualization, a visualization application program 203 that describes how the data is to be shown in the visualization, a project file 204 that contains an executable form of application program 203, and visualization maker 207 which produces the visualization described in application program 203 on one or more displays 213 using the data in data source 205. Within visualization maker 207, data model 209 describes how the data from data source 205 is to be mapped onto the components of the visualization. For example if the visualization employs a graph, data model 209 will describe what information from the data source is to be represented in the nodes and how information from the data source is to be used to determine how the links connect the nodes. Styling engine 211 uses the description of the visualization in project file 203 to produce the visualization in display 213 using the information from data source 205 and the mappings in data model 209. For example, styling engine 211 would take the node and link content specified by information from data source 205 as mapped onto the nodes and links by data model 209 and determine how the nodes and links look, how the content is represented in the nodes and links, and how the graph is arranged in display 213. Of course, styling engine 211 is implemented by a processor executing a program, while data model 209 is data stored in memory accessible to the processor.

The nodes produced by the visualization systems have two important limitations:

only a relatively small amount of information can be associated directly with the node; and
there is little choice as to where the information will be displayed relative to the node.

Typically, all that is permitted is a label like that shown at 105 in FIG. 1. What is needed is an easy-to-use technique that permits a user of a visualization system to associate more information with the node and gives the user more control over where the information is located and how it looks. Also needed as it becomes possible to associate more information with a node are techniques for reducing the effort involved in associating the information with the node. It is an object of the invention to provide such techniques.

SUMMARY OF THE INVENTION

The object of the invention is attained in part by a representation of a node in memory. The memory is accessible to a processor that is executing code that creates a display including the node. The representation includes a node object that represents the node and a set of attribute representations associated with the node object. An attribute representation includes a specification of a location of a plurality thereof relative to the node when the node is displayed. The processor uses the information in the representation of the node to create the display with the attributes represented by the attribute representations at the specified locations relative to the node.

In further aspects of this portion of the invention, the attribute representations may include representations of content attributes. In addition to the specification of a location, a content attribute representation includes at least a specification of a value and may also include a specification of a type for the value. The types include a label type, an image type, and a glyph type.

The attribute representations may also include representations of action attributes. An action attribute specifies an action to be performed in response to user input from a pointing device at the location specified in the action attribute. An action attribute may operate on a value specified in a content attribute for the location. The code that creates the display includes an application programmer's interface that permits setting and reading of content attribute types and values and the setting of action attributes.

The location specified in the attribute representation is one of a predetermined plurality thereof. The locations may be either inside or outside the node and are specified in terms of a direction relative to the node and whether the location is inside or outside the node.

The object of the invention is further attained by a method of drawing a node that has the content attributes just described. In the method, an uncompressed representation of the predetermined set of locations is made and the specified content attribute values are related to the locations in the uncompressed representation that correspond to the locations specified for the specified values, a compressed representation is made in which unnecessary white space between the specified values is eliminated and the compressed representation is used to render the node.

The object of the invention is further attained by a representation of a set of attributes that are applicable to an element of a graph drawn by a processor. The representation includes an element type associated with the element. The element type belongs to a hierarchy of element types and representations of attributes belonging to the set that are associated with the element types of the hierarchy. The representations of attributes may also be associated with the element rather than with a type of the hierarchy. The root of the hierarchy is a default element type for which a complete set of the attributes applicable to the element has been defined and an attribute which has been set by a representation at a given level in the hierarchy overrides an attribute which has been set by a representation at a higher level. Representations of attributes that are directly associated with the element are at the lowest level of the hierarchy. The code executed by the processor includes an interface whereby an attribute may be set at any level in the hierarchy.

When an element has the representation of a set of attributes just described, the following method is used to obtain the set of attributes belonging to the element. The steps of the method, which are performed for each level of the hierarchy, beginning at the lowest level, add any attribute belonging to the element which was not set at a lower level but is set at the current level to the set of attributes and go to the next level of the hierarchy.

Other objects and advantages will be apparent to those skilled in the arts to which the invention pertains upon perusal of the following Detailed Description and drawing, wherein:

BRIEF DESCRIPTION OF THE DRAWING

FIG. 7 shows an API for creating node types;

FIG. 8 shows an API for creating nodes;

FIG. 9 shows an API for getting a node description;

FIG. 10 shows an API for setting content attributes;

FIG. 13 shows an API for getting a content attribute's value and an API for getting a content attribute's type;

FIG. 14 shows an API for associating an action with a node;

FIG. 15 illustrates the InteractionProperties class and a constructor therefor;

FIG. 16 shows example Java™ code for defining nodes and node types;

FIG. 18 is a first portion of Java code for defining the graph of FIG. 17; and FIG. 19 is a second portion of the Java code of FIG. 19.

Figure 1:
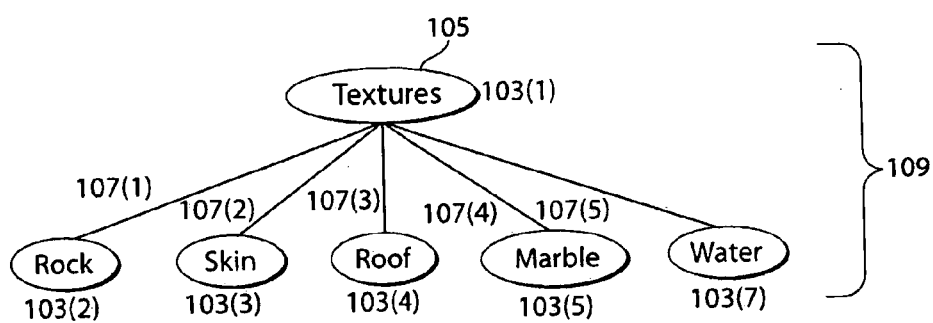
FIG. 1 shows a typical graph.
Figure 2:
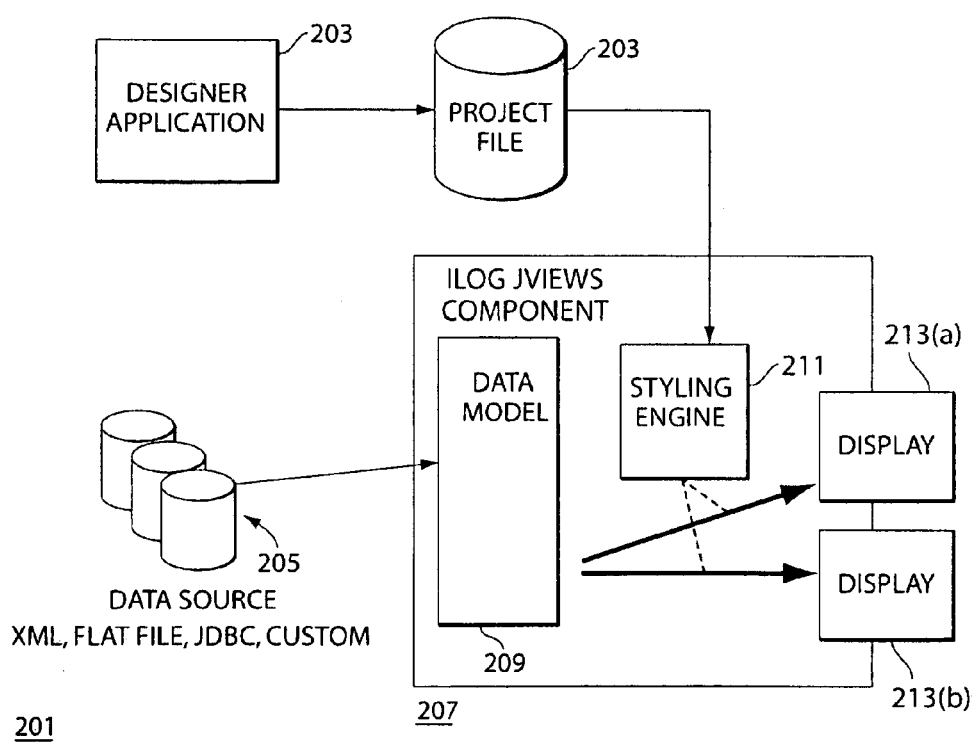
FIG. 2 is a high-level block diagram of a prior-art visualization system.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first show how a node may be made to carry far more information than a single label, will then show how the information carried by such nodes may be specified and how such a node is represented, will disclose an application programmer's interface (API) for such nodes, and will finally disclose how types and inheritance may be used to reduce the programming effort involved in associating information with elements of a graph.

Figure 3:
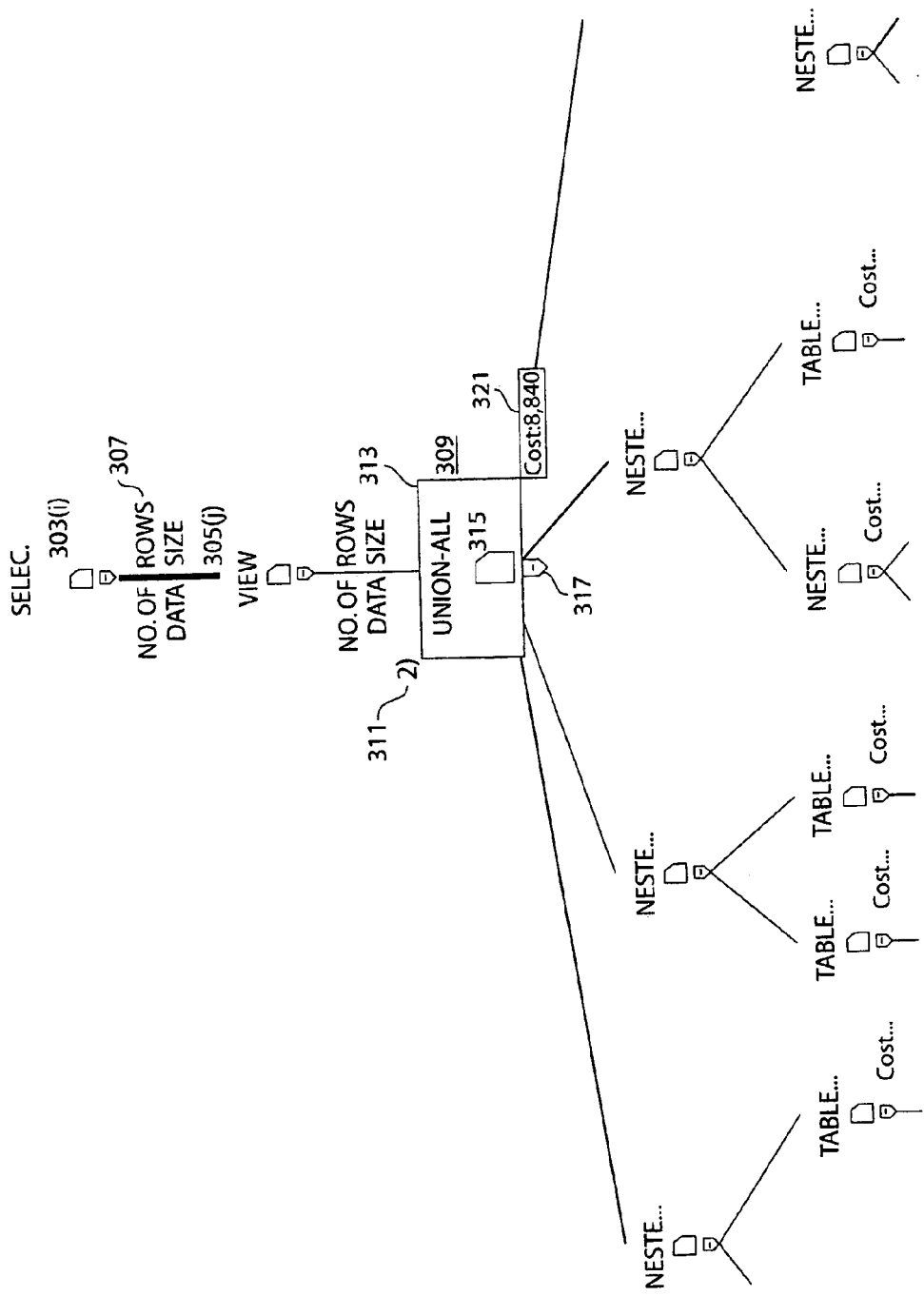
FIG. 3 shows a graph made using the node representations of the invention.

Associating more Information with Nodes: FIG. 3

FIG. 3 shows a graph 301 whose nodes that can carry far more information than a single label. Graph 301 is a graph of how the information specified by a query on tables in a database system is assembled. Each node 303 of the graph represents a table that is either a base table in the database system or a table which is produced in the course of the query. The root node of the graph is the final table produced by the query; the leaf nodes are the base tables. The children of a table are the tables from which the parent is produced. The labels 307 on the links 305 indicate for each child the number of rows which the child contributes to the parent table and the size of the data in those rows. The information associated with the nodes and links is produced by a query analysis program as the query represented by the graph is executed.

Node 309 is a magnified node. The system that produces graph 301 automatically magnifies a node 303 when the cursor passes over it. In magnified node 309, the information associated with the node is clearly visible. The information includes a node number 311, a node label 313, an image 315, a cost value 321, indicating the cost of making the table represented by the node, and glyph 317. All of the information is also available for the reduced nodes. For example, when the node is reduced, its label 313 appears above the node. In some cases, however, the information may be seen only when the node is magnified. By clicking on glyph 317 the user may cause the system to expand or collapse the node. In an expanded node, children belonging to the node are displayed; in a collapsed node they are not. Glyph 317 includes a "+" sign when its node is collapsed and a "−" sign when the node is expanded. It should be pointed out here that what information is associated with the node and the manner in which it appears in the node is completely determined by the user of the visualization system which produces graph 301.

Figure 4:
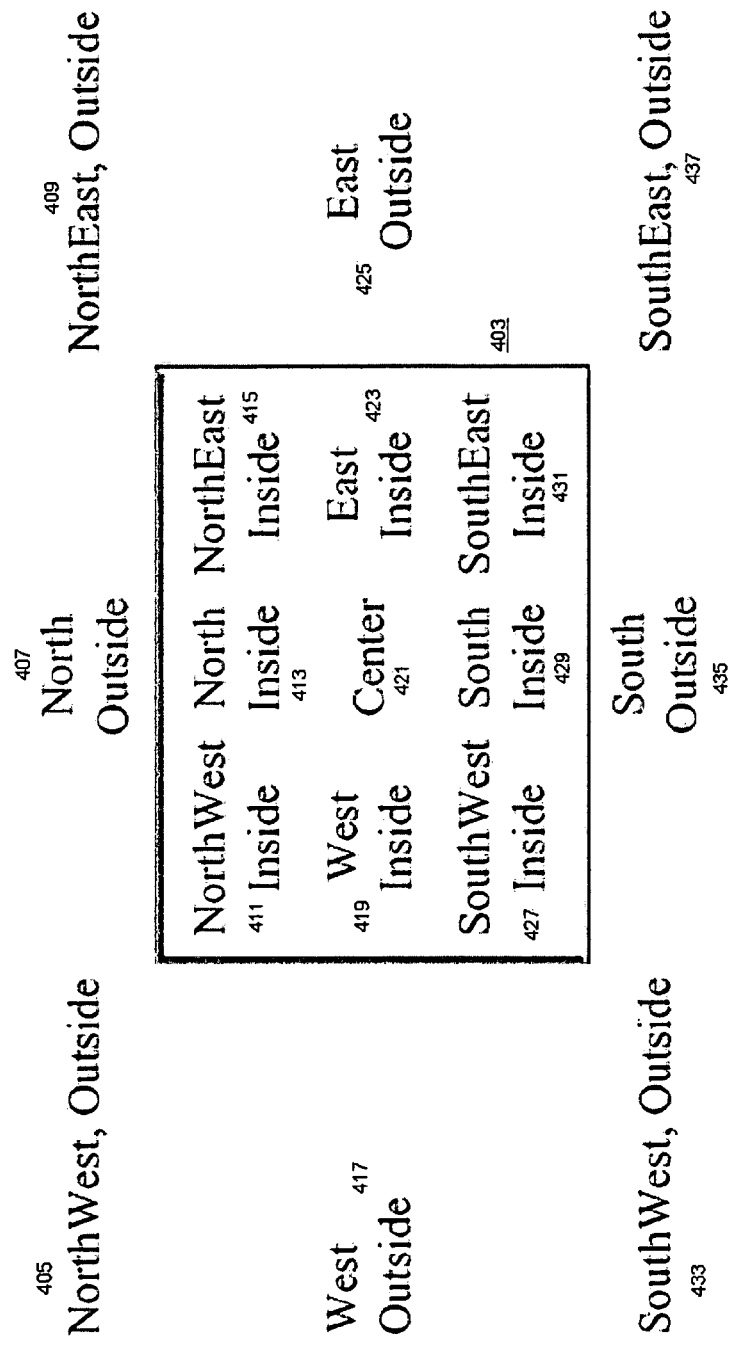
FIG. 4 is a diagram showing the possible locations of information associated with a node.

Specifying how Information is to be Associated with a Node: FIG. 4

In a preferred embodiment, nodes can have up to 17 different pieces of content in them. These pieces of content will be termed in the following node content attributes. Each node content attribute has a location relative to the node, a content type that specifies whether the content attribute is a label, an image, or a glyph, and a value for the node content attribute. The value for a content attribute having the label type may be any piece of text. The value for a content attribute having the image type may be any image that can be loaded into a java.awt.Image object. The value for a content attribute having the glyph type is one of a few pre-defined 'images'. The locations of the node parts are described by a cardinal direction and a flag to indicate whether the location is inside the border of the node. The 17 locations 401 are shown in FIG. 4. Box 403 separates locations which are inside the border of the node from those which are outside. The 17 locations are indicated at reference numbers 405-437. When locations 401 are compared with the locations of the information associated with expanded node 309, it will be seen that node number 2 is at NorthWest, Outside position 405, label 313 is at North Inside position 413, image 315 is at Center position 421, glyph 317 is at South Outside position 435, and cost statistic 321 is at SouthEast, Outside position 437.

Figure 5:
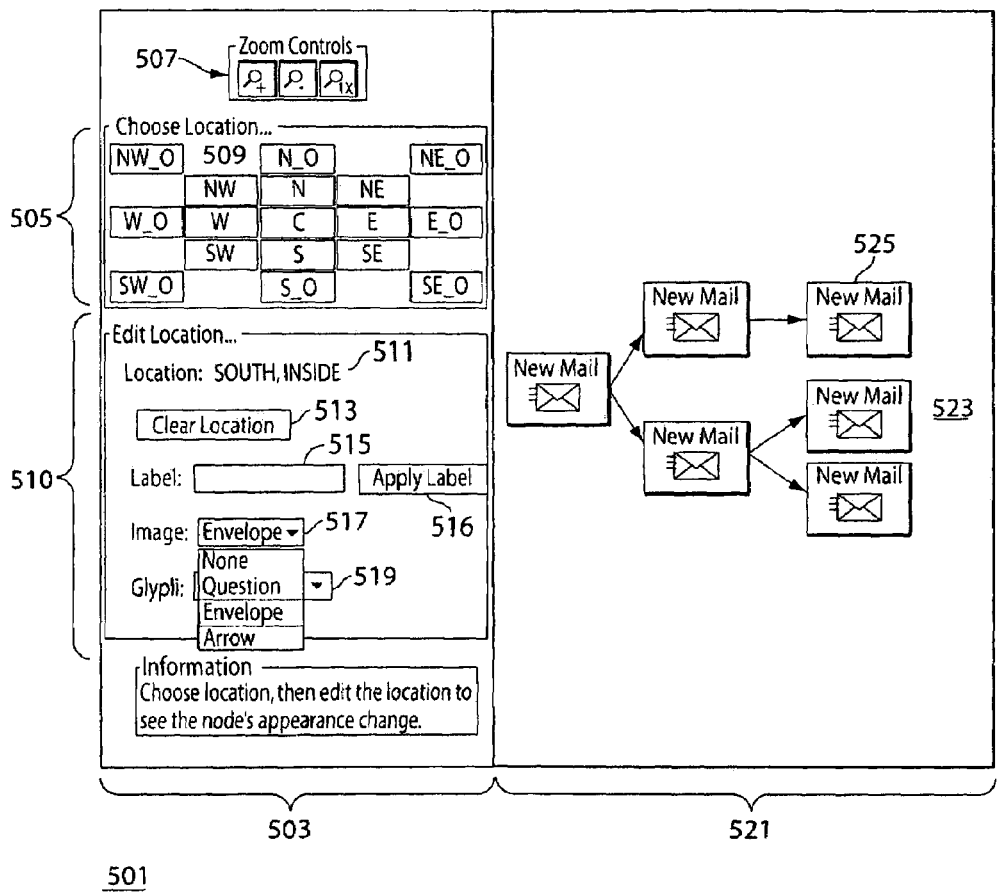
FIG. 5 shows a user interface for designing nodes.

A Graphical User Interface for Associating Labels, Images, or Glyphs with a Node: FIG. 5

FIG. 5 shows a graphical user interface 501 for associating node content attributes with a node. The graphical user interface has two main parts: an editing portion 503 in which a node may be edited and a display portion 521 in which the results of the changes made at 503 are visible.

Beginning with display portion 521, portion 521 shows a graph 523 of nodes 525. All of these nodes have the same type and will be affected in the same way by the editing done using editing portion 503. Each node 525 shows the current state of the editing of graph 523.

Continuing with editing portion 503, at the top of portion 603 is zoom control 507, which determine how the graph in display portion 521 is displayed. Then comes a set 505 of location selection buttons 509. There is a button for each of the 17 locations for node content attributes relative to a node. To edit a location, one clicks on the button for the selected location. Editing of the selected location is done using buttons and dropdown menus in portion 510. The selected location appears at 511; button 513 permits the user to clear the selected location. Three kinds of editing are possible: a label may be specified at 515, and when one is, it can be applied by clicking on apply button 516. In an editing step done before the step shown in FIG. 5, the New Mail label was added at the Center location. In FIG. 5, an image of an envelope is being added at the location South, Inside. The image is being selected from a drop-down list 517. At 519, a glyph may be selected from a drop-down list in the same fashion. The arrow glyph is the glyph shown at 317. As already explained, the arrow glyph has the expand and collapse operations associated with it. In other embodiments, users may be able to define their own actions that are to be performed when a user clicks on a node content attribute. As will be explained in more detail in the following, the result of the editing operation is a node_desc data structure for the node type for the nodes displayed at 521. The node_desc data structure specifies the selected labels, images, or glyphs.

Representing Nodes

Figure 6:
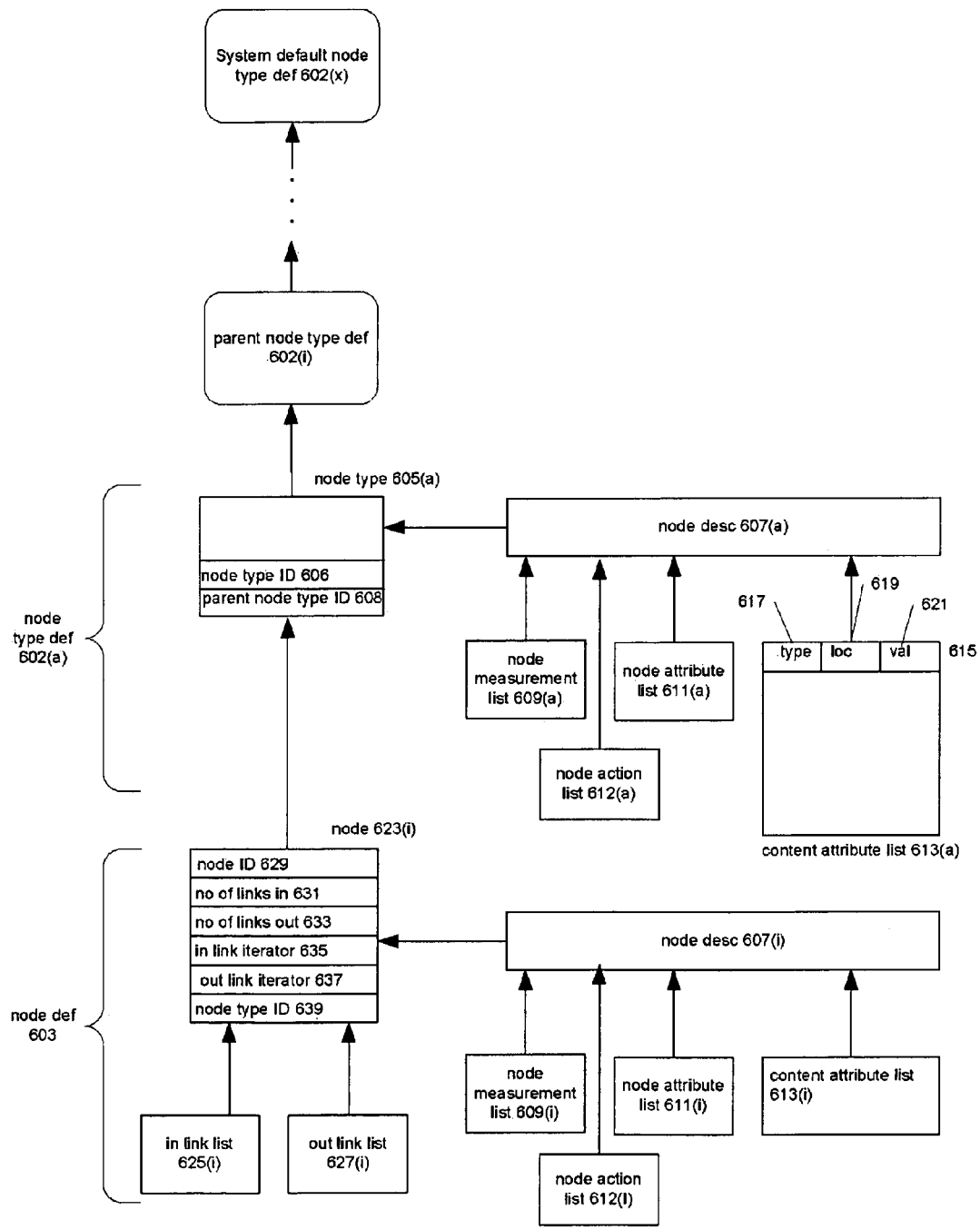
FIG. 6 shows data structures used to define node types and nodes.

In a preferred embodiment, the nodes and node parts are objects that are defined using the well-known Java™ programming environment. A feature of the Java programming environment is that the environment supports objects that have references to other objects. Thus, a node may be defined by a collection of objects, with references in the collection of objects being used to associate the objects in the collection with each other. FIG. 6 shows the Java objects which define a node in a preferred embodiment. The arrows in FIG. 6 indicate associations between the objects making up the definitions. Definitions 601 include a node type definition 602 which defines the type of a set of nodes and a node definition 603 for a node belonging to the node type definition. Beginning with node type definition 602, node type object 605 represents a node type. Included in the object are a node type ID 606 for the node type represented by the node type object and a parent node type ID 608 for the node type object that represents the parent of the node type represented by the particular node type object. As can be seen from the existence of parent node type ID 608 and by the node type defs 602 (a, i, and d), node types are hierarchical. Descendants of a node type inherit the attributes of the ancestor, but the attributes may be modified in the descendant. At the top of the hierarchy is a system-defined default node type 602(x) which may also be modified. If no node type is specified for a node when a node is created, the node gets the default node type.

The most important component of node type definition 602(a) for the present discussion is node description object 607(a), which is associated with node type object 605(a) and describes the appearance of nodes having the node type represented by node type object 605(a). Four lists may be associated with a node description 607:

node measurement list 609, which is a list of the current physical measurements of the node's display;

node attribute list 611, which is a list of user-defined attributes such as color which apply to the entire displayed node;

node action list 612, which is a list of actions which may result from mouse events over a node or a location of a content attribute; and content attribute list 613, which has an entry 615 for each of the content attributes belonging to nodes of the node type defined by node type object 605(a).

Of these lists, content attribute list 513 is most important for the present discussion. Each entry 615 includes a type field, which indicates whether the content attribute is a label, glyph, or image, a location field which specifies which of the 17 locations is the location of the content attribute, and a value field which indicates the value of the content attribute. The value corresponds of course to the type; for example, for labels, the value is a character string.

Node definition 603 defines a node that belongs to a given node type. The node is represented by node object 623(i), which is associated with node type object 605(a). Information in the node object includes the following:

the identifier 629 for the node object;

the number of in links, i.e., links which have the node as their destination 631;

the number of out links, i.e., links which have the node as their source 633;

a specifier 635 for iterator code which returns the next in link;

a specifier 637 for iterator code which returns the next out link; and the identifier 639 for the node type object for the node's type.

Node object 623(i) has associated with it a node description 607(i). When the node corresponding to node object 623(i) is created, it inherits the attributes specified for its node type. Thus, node object 623(i) inherits the attributes specified for node type definition 602(a). The lists associated with a node description 607 contain only information which has been added to define the node or node type to which node description 607 belongs; thus, to obtain a complete set of attributes for a particular node, the visualization system begins at the bottom of the hierarchy of node descriptions 607 and visits all of the node descriptions 607 in the hierarchy in turn. A content attribute for a location that is found at a lower level of the hierarchy of node descriptions 607 overrides a content attribute for a location that is found at a higher level of the hierarchy. The node description for the default node type specified a content attribute for every one of the locations, and it is these attributes which govern if none are specified at lower levels of the hierarchy. Each node object 623 further has lists of in links (625) and out links 627).

Figure 12:
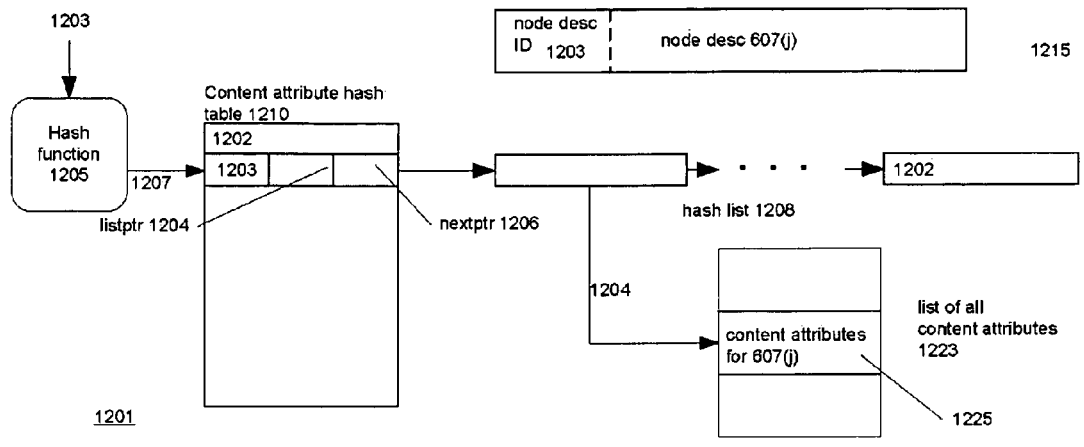
FIG. 12 shows a technique for compressing the specification of the content attributes.

Details of Content Attribute List 613: FIG. 12

FIG. 12 shows at 1201 how content attribute list 613 is implemented in a preferred embodiment. Each node description 607(*i*) has a node description ID 1203 which is used by the Java programming environment to associate the node description with its node measurement list 609(*i*), node attribute list 611(*i*), node action list 612(*i*), and content attribute list 613(*i*). In the case of content attribute list 613(*i*), association is implemented using content attribute hash table 1210, hash function 1205, hash table 1210, hash list 1208, and list of all content attributes 1223. As is standard programming practice, node description ID 1203 is hashed by hash function 1207 to produce an index 1207 into content attribute hash table 1210. The hash table entry 1202 at the location specified by the index contains at least a node description ID value, a pointer 1204 to a location in list 1223, and a next pointer 1206 which points to the next item in a hash list 1208. Each item in the hash list 1208 has the same fields as hash table entry 1202.

To find the content attribute list for a given node description 607(*i*), the program examines the content attribute hash table entry 1202 at the point indicated by index 1207; if its node description ID field 1203 contains the id of node description 607(*i*), listptr field 1204 will contain a pointer to the location 1225 of the content attributes for node description 607(*i*); if node description ID field 1203 does not contain the node description ID for node description 607(*i*), the program follows nextptr 1206, to the next entry 1202 in hash list 1208, which is examined in the same way. The search continues until an entry in hash list 1208 is found which contains the node description for node description 607(*i*). That entry's listptr 1204 will point to the content attributes for node description 607(*i*).

Compressing the Content Attributes for a Node

In the preferred embodiment, there are two phases to making a graph: configuring the graph and rendering the graph for display. In the configuration phase, the content attributes for a given node are specified in content attribute list 1613 for the given node and/or the content attribute lists belonging to the given node's hierarchy of node types. At the beginning of the rendering phase, all of the content attributes for the node are collected and placed in an uncompressed array for the node. A compressed array for the node is then made from the information in the uncompressed array and is used instead of the uncompressed array to render the node. The compressed array contains only the information needed to correctly display the content attributes in the node. In particular, the compressed array removes all "white space" that is not required to display the content attributes. For example, the only locations in node 309 which contain content attributes are NOW 405, NI 413, C 421, S0 435, and SEQ 437. The locations 422, 419, and 417 in the column NWI-SWI contain no content attributes, nor do the locations 415, 423, and 431 in the column NEI-SEI. Similarly the locations 427, 429, and 431 in the row SWI-SEI contain no content attributes; consequently, removal of the white space corresponding to those rows and columns does not affect the relationship to each other in the display of the locations in node 309 that correspond to the content attributes.

The Uncompressed Array

The uncompressed and compressed arrays are shown at 1214. Beginning with uncompressed array 1209, all of the information about the content attributes from the node's node description and the node descriptions from the node's type hierarchy is collected and written to uncompressed array 1209. There is an entry 1212 in uncompressed array 1209 for each of the 17 possible locations for which content attributes may be specified. Each entry 1212 contains a row value 1211, a col. value 1213, a content attribute type value 1215, and a pointer 1217 to the content attribute's value. The row and column values specify the content attribute's location in terms of positions in the 5×5 array element map shown at 1221. Thus, the position NO has the row and column number 0,2 in map 1221, and the entry for NO in uncompressed array 1209 has the value 0 in field 1211 and the value 2 in field 1213.

The reason why the locations of the content attributes are described in terms of the rows and columns of array element map 1221 is that at rendering time, the horizontal and vertical dimensions provided to render a particular content attribute's value are determined from the largest horizontal and vertical dimensions of the content attribute values in the row and column to which the content attribute belongs. If the particular content attribute value's height and/or width is less than these largest dimensions, the particular content attribute's value is centered in the rectangle defined by the horizontal and vertical dimensions. In a preferred embodiment, the width allotted to display all of the content attributes in a column is the maximum width required to display any content attribute in the column; similarly, the height allowed to display all of the content attributes in a row is the maximum height required to display any content attribute in the column. Thus, in node 309, glyph attribute 317 belongs to column 2 and row 4. Column 2 contains another content attribute, namely the label UNION_ALL 313, which is wider than glyph attribute 317, while row 4 contains only glyph attribute 317. Consequently, the available horizontal dimension for glyph attribute 317 is determined by the label UNION_ALL 313 and the available vertical dimension is determined by glyph attribute 317 itself.

FIG. 12 shows uncompressed array 1209 as it would be configured for node 309 of FIG. 3. There are five content attributes for the node: label 311 at position NWO, label 313 at position NI, image 315 at position C, glyph 317 at position SO, and label 321 at position SEQ. There are accordingly five elements 1212 of uncompressed array 1209 that are of interest: the element with row and column 0,0, the element with row and column 1,2, the element with row and column 2,2, and the element with row and column 4,2. The other elements in uncompressed array 1209 do not correspond to any content attributes, as indicated by the fact that their ptr fields 1217 contain null pointer values.

Compressed Array 1209

As can be seen from the above enumeration of elements of interest, there are no elements of interest from row 3 of array element map 1221 and no elements of interest from columns 1 and 3. This fact is taken into account at the beginning of the rendering phase, at which time, uncompressed array 1209 is compressed to produce compressed array 1219. Compressed array 1219 is compressed by removing all elements of uncompressed array 1209 which belong to rows or columns that do not contain items of interest. Thus, compressed array 1209 here contains all of the elements of uncompressed array 1209 EXCEPT the elements that belong either to row 3 or to columns 1 and 3. The compression thus retains the proper relationships between the positions of the content attributes while removing all unnecessary white space. The widths of the remaining columns and the heights of the remaining rows are determined as described above.

The Application Programmer's Interface for Defining and Reading Content Attributes: FIGS. 7-11 and 13-15

In a preferred embodiment, content attributes are manipulated using an application programmer's interface (API) written in the Java™ programming language. The API permits a programmer to create node types and nodes, to get the node descriptions for the node types and nodes, and to set and read the content attributes in the node descriptions. The API for creating node types is shown at 701 in FIG. 7. The description of the API has the following parts: the interface description, shown at 705, which indicates the Java class the interface belongs to, the name of the interface at 705, and any parameters which it requires at 706. At 707, the function performed by the interface is explained; at 709, what the interface returns is described. There are four create node type interfaces: interface 703 creates a node type with an ID provided by the Java system. Since no node type is specified in the parameters, the node type will be the default node type. Interface 711 creates a node type from a specified parent node type. Interface 713 is like interface 703 except that it also specifies an ID for the node type; interface 715 is like interface 711 except that it also specifies an ID for the node type.

The API 801 for creating nodes is shown in FIG. 8. There are four interfaces for creating nodes. Interface 803 creates a node and specifies neither a node type nor an identifier for the node, so the node receives an ID provided by the Java system and the default node type. Interface 805 creates a node with the node type specified in the interface. Interface 807 does not specify a node type, but does specify an ID for the node type; interface 809 specifies a node ID, a node type, and an image to be displayed in the CENTER location. Interfaces like 809 may also be used to specify labels and glyphs to be displayed in the CENTER location. A side effect of interface 809 and its peers is that the content attribute for the CENTER location is set in the node's NodeDesc object.

The API 901 for getting a node description is shown in FIG. 9. There are three interfaces: one, 903, for getting a node's node description, a second, 9095, for getting a node type's node description, and a third, 907, for getting the node description for the default node type. Once a node description has been gotten, the information contained in it may be set and read. The API for setting content attributes is shown at 1001 in FIG. 10. API 1001 includes an interface 1003 for setting the CENTER content attribute by specifying a content type and value for the content attribute and an interface 1005 for setting a content attribute at any of the 17 locations that a content attribute may occupy by specifying the location, the content type, and the value for the content attribute. The location is specified by an integer value specifying whether the location is NW, N, NE, E, C, W, SW, S, SE and a Boolean value specifying whether it is inside the node or outside of it. Interface 1007 is used to set attributes applying to the entire node, such as the node's color. Interface 1009, finally, is used to set a user-defined attribute that applies to the node. The API also permits a content attribute's type to be set and read separately from its value. The interface for reading the content attribute's type is shown at 1307 in FIG. 13; the interface for writing the content attributes' type can be inferred from interface 1307.

The API for reading content attributes is shown at 1301 of FIG. 13. In API 1301, interface 1303 is used to get the value of the CENTER content attribute, while interface 1305 is used to get the value of a content attribute at any of the 17 locations.

The API for defining the manner in which the node behaves in response to inputs from the mouse is shown in FIGS. 14 and 15. FIG. 14 shows the API 1401 for setting the behavior of a node. Interface 1403 is the interface for associating a behavior with a location in the node. The parameters include the node, the location in the node, and an InteractionProperties object that contains the definition of the interaction. An interaction may be associated with a location in a node regardless of whether there is a content attribute associated with the location. Interface 1405 is the interface for associating a behavior with the entire node.

FIG. 15 shows at 1501 what an InteractionProperties object is and how such an object is created. The class definition is at 1503. At 1505 is shown the constructor for an InteractionProperties object. The parameters specify interactions between the mouse and the node or node part and each parameter is associated with an action. The action is written in an XML representation of scalar vector graphics. Special strings in the XML representation are used to represent values that are obtained from the node the action is being executed on. Among the values that can be obtained are IDs belonging to the node, the X and Y coordinates of the location of the node or the location of a content attribute, the width and height of the node or content attribute, the value of a user-defined attribute, the content type of a content attribute, and the label or glyph used in a node or content attribute.

Example Code which Defines Node 309: FIG. 16

FIG. 16 shows a fragment 1601 of code written in the JAVA language which defines node 309 of FIG. 3. At 1603, a new InteractionProperties object, imProps, is created; at 1605, behaviors are defined for imProps. The special string $DATAID$ provides the ID 629 of the node to the action and the special string $LABEL$ provides the label at the C position to the action. At 1607, the node description for the default node type is fetched and the interaction properties of the node description are set to the behaviors defined for imProps.

At 1609, a source of the data to be displayed using the graph is obtained; at 1611, a new node type, QueryGraphNodeType, is created. At this point, the new node type inherits the default node type, and thus has the behavior defined by improps. At 1613, a node description QueryGraphNodeDesc having the QueryGraphNodeType is fetched.

At 1616, a new node this Node is created which has the node type QueryGraphNodeType. At 1617, the node description for the new node is referenced. At 1619, the values of the attributes in the content attribute locations NWO, NI, C. SO, and SEQ are set in the referenced node description. When the rendering phase is reached, these content attributes as well as the ones inherited from the node type hierarchy are written to uncompressed array 1209, from which compressed array 1219 is produced. When node 309 is rendered as specified in compressed array 1219, it will appear as it does at 309 in FIG. 3.

Inheritance of Attributes in Nodes and Links: FIGS. 11, 17-19

As pointed out in the foregoing discussion of content attributes of nodes, the set of attributes that a particular node has includes not only attributes defined for that node, but attributes defined in a hierarchy of node types beginning with the node's node type and continuing up the hierarchy until a default node type is reached at the top of the hierarchy. Default values for all of the attributes that may be defined for a node are defined in the node description 607 for the default node type. If a node description 609 at any level of the hierarchy defines an attribute, that definition overrides any definitions that are higher in the hierarchy. Inheritance is used in the graph drawing system of the invention not only to define the attributes of nodes, but also of links.

The advantage of inheritance in defining nodes and links is that it greatly simplifies the task of the programmers who implement the display of a graph representing a particular set of information. Instead of having to provide a detailed description of the attributes for every individual node and link used in the display, a programmer can set up the default type for the nodes or links so that it contains the attributes that will be common to all of the nodes or links, can define node or link types that inherit the default attributes for the most common variants of nodes or links, can further use these types to define other types and use the types to define nodes, leaving little if any work to be done in defining the attributes for a particular node.

Figure 11:
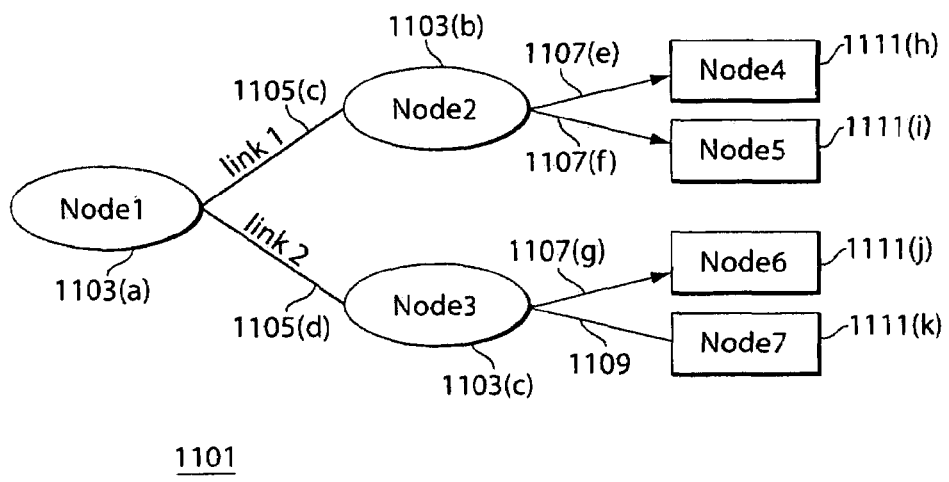
FIG. 11 is an example graph illustrating inheritance.

FIG. 11 gives an example of the advantages of hierarchical definition of nodes and links. Graph 1101 in FIG. 11 includes elliptical nodes 1103 and square nodes 111 having different colors, links 1105 with link labels, a first line type and a first color, links 1107 with no labels, a second line type, a second color, and arrowheads, and a link 1109 which is a variant of a link 1107 without an arrowhead. To set up graph 1101, one need only define a node type for the nodes 1103, a link type for the links 1105, a node type for the nodes 1111, a link type for the links 1107, and a modification of the type for links 1107 for the single link 1109.

Figure 17:
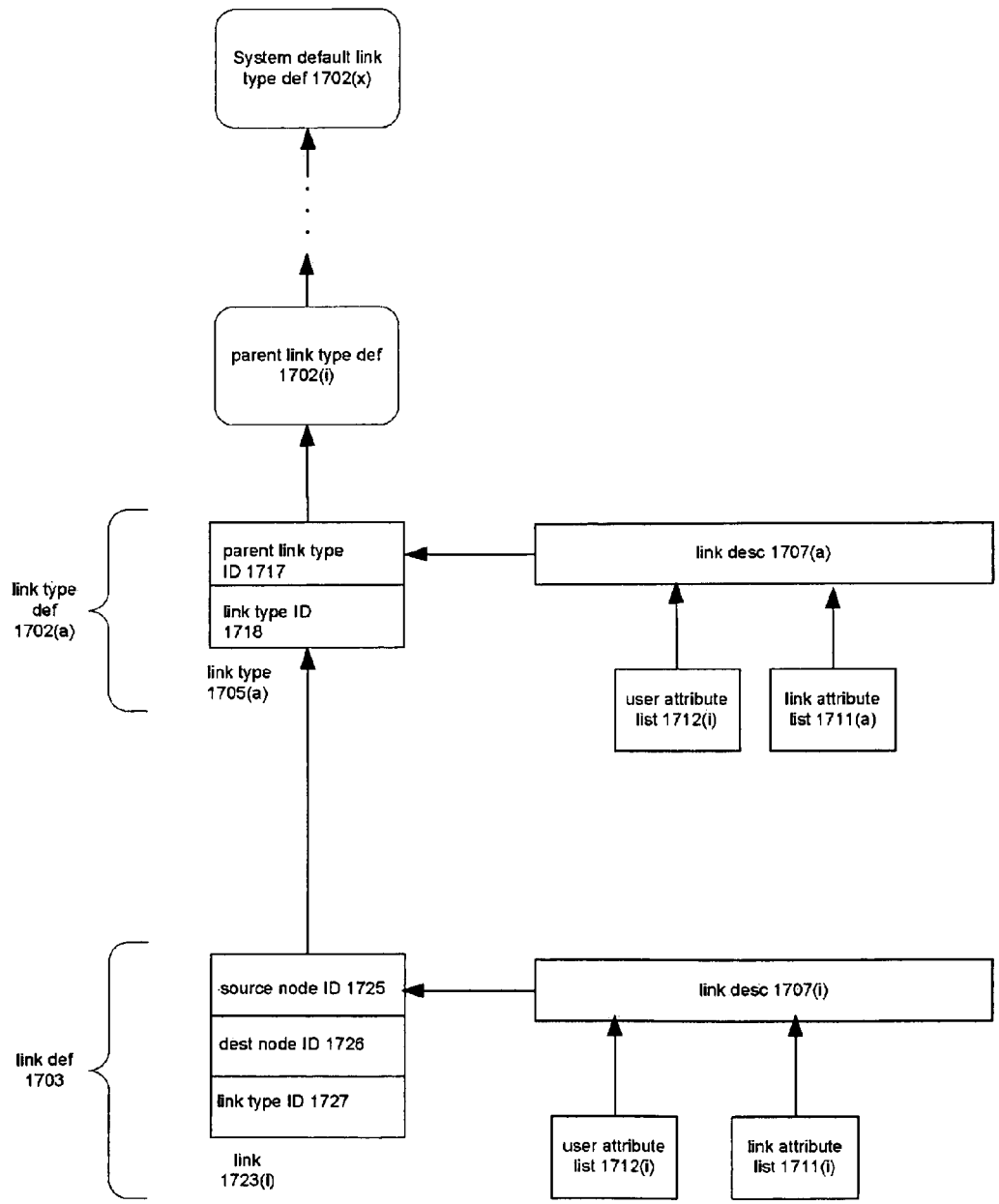
FIG. 17 shows data structures used to define link types and links.

FIG. 17 shows the data structures used to define links and link types in a preferred embodiment. The relationships of the structures to each other closely resemble those of the structures used to define nodes and node types. A link definition 1703 has link object 1723 and a link description object 1707 is associated with the link object. If any link attributes are specially defined for the particular link represented by the link object, the link description 1707 has a list containing those attributes. There are two kinds of attributes for links: user attributes that are completely defined by the user and are contained in user attribute list 1712, and attributes that are the user defines using elements provided by the visualization system. Examples of the latter attributes are link line thickness, link line color, link line labels, and arrow heads. Link object 1723 contains three items of information: an ID 1725 for the node object that is the source of the link, an ID 1726 for the node object that is the destination of the link, and an ID 1727 of the link type object that defines the link object's type. A link type definition is shown at 1702(a); the definition includes a link type object 1705 and a link description object 1707(a). Specifications of link attributes that are specially defined for the link type represented by the link type object are in the lists 1712 and/or 1711 associated with the link description 1707. Link type object 1705 includes an ID 1717 for the link type and ID 1718 for its parent link type in the link type hierarchy. At the top of the hierarchy is system default link type definition 1702(x).

The data structures of link definitions 1703 and link type definitions 1702 are manipulated in a preferred embodiment by a Java API similar to the API for manipulating node definitions and node type definitions.

Determining the Attributes of a Node

The following pseudocode indicates how the attributes of a node are determined from the hierarchy of node descriptions 607 for the node and the hierarchy of node types to which the node belongs. The first pseudocode function shows how the parent node description in the hierarchy is obtained from a given node description:

```
NodeDesc parent_of(nodeDesc) {
    if (nodeDesc is for a Node)
        return getNodeDesc(node.getType( ));
    if ((nodeDesc is for a NodeType) && (nodeType.getParentType( ) != null))
        return getNodeDesc(nodeType.getParentType( ));
    if ((nodeDesc is for a NodeType) && (nodeType.getParentType( ) == null))
        return getDefaultNodeDesc( );
}
```

When a NodeAttribute's value is looked up from a node description, the visualization system first checks to see if the attribute is set on the node description. If it is, then the value found there is returned. Otherwise, the attribute is looked up on the parent node description, recursively. If the attribute hasn't been set anywhere in the hierarchy of node descriptions, the value is found from the default node description (which has values set for all attributes). This is summarized in the following pseudo-code function:

```
Object getAttribute(nodeDesc,nodeAttr) {
    if (nodeDesc.isAttributeSet(nodeAttr))
        return nodeDesc.getAttribute(nodeAttr);
    else
        return getAttribute(parent_of(nodeDesc),nodeAttr);
}
```

The defaulting mechanism for node content attributes (ContentAttribute) is more complicated. When a content attribute's value is looked up from a node description in a given location, the visualization system first checks to see if the attribute is set on the node description in that location. If it is, then the value found there is returned. Otherwise, the attribute is looked up in the LOCATION_NONE location of the node description. If the attribute is found there, then the value is returned. If not, then the attribute search continues recursively on the parent hierarchy until a value is found. If the attribute is not set anywhere in the hierarchy, it will be found in the LOCATION_NONE of the default node description (where all content attributes have a value set). This defaulting is summarized in the following pseudo-code function:

```
Object getAttribute(nodeDesc,nodeLocation,nodeAttr) {
    if (nodeDesc.isAttributeSet(nodeLocation,nodeAttr))
        return nodeDesc.getAttribute(nodeLocation,nodeAttr);
    else if (nodeDesc.isAttributeSet(LOCATION_NONE,nodeAttr))
        return nodeDesc.getAttribute(LOCATION_NONE,nodeAttr);
    else
        return
            getAttribute(parent_of(nodeDesc),nodeLocation,nodeAttr);
}
```

Determining the Attributes of a Link

The attributes of a link are determined in much the same way as the attributes of the node. The following pseudo-code function is for obtaining a link description 1707 for a parent link type:

```
LinkDesc parent_of(linkDesc) {
    if (linkDesc is for a Link)
        return getLinkDesc(link.getType( ));
    if ((linkDesc is for a LinkType) && (linkType.getParentType( ) != null))
        return getLinkDesc(linkType.getParentType( ));
    if ((linkDesc is for a LinkType) && (linkType.getParentType( ) == null))
        return getDefaultLinkDesc( );
}
```

The visualization system first checks to see if the attribute is set on the link description. If it is, then the value found there is returned. Otherwise, the attribute is looked up on the parent link description, recursively. If the attribute hasn't been set anywhere in the hierarchy of link descriptions, the value is found from the default link description (which has values set for all attributes). This is summarized in the following pseudo-coded function:

```
Object getAttribute(linkDesc,attr) {
    if (linkDesc.isAttributeSet(attr))
        return linkDesc.getAttribute(attr);
    else
        return getAttribute (parent_of(linkDesc),attr);
}
```

This method of defaulting attribute values is very powerful for customizing all the links in the topology at the same time. It also enables customizing groups of links by giving them the same type.

Using Inheritance to Define the Nodes and Links in Graph 1101: FIGS. 18 and 19

FIGS. 18 and 19 show portions of Java code which creates the nodes and links in graph 1101. Beginning with FIG. 18, which shows how the node types are defined and the nodes created, at 1803, two node types are created: nodeType1, which will become the type for the nodes 1103, and node-Type2, which will become the type for the nodes 1111. At 1805, a node description variable is set to null and color variables are set to the colors that will be used for nodes of the two types. At 1807, the node description 607 for nodeType1 is referenced and the background color attribute for nodes of the type is set to the value of the color variable mildBlue and the shape attribute is set to oval. At 1809, the node description 607 for nodeType2 is fetched and its background color is set to the value of the color variable lightPurple. The square shape of nodes 1111 is inherited from the default node description. At 1811, the static variable which determines whether the default mode for displaying a node is expanded or collapsed is set to cause the visualization system to show the nodes in expanded form, that is, with their children. At 1813, the seven nodes of graph 1101 are created; the nodes 1103(a . . . c) are given the node type nodeType1 and the nodes 1111(h . . . k) are given the node type nodeType2. Also specified when each node is created is the label that will appear in the center content attribute location. At this point, each node description 607 for a node of graph 1101 will have only a content attribute list 613 and a single entry in that content attribute list, namely the node's label. All of the other attribute information for the nodes is inherited from the nodes' node type hierarchies.

Continuing with FIG. 19 and the code 1901 for creating and defining link types and links, two link types, linkGroup1 and linkGroup2, are created at 1903. Color variables for the links' colors are and set at 1905; a link description variable is set at 1907. At 1909, the attributes for the link type link-Group1 are set; the color of links of the type is set to dark blue, the link is given a thickness greater than the default thickness, it is not given an arrowhead, any label given the link is to be drawn, and the label is to rotate along with the link. As thus defined, links of link type linkGroup1 are the links 1105 of FIG. 11. At 1911, the attributes for links having the link type linkGroup2 are set; the color of the link is set to dark purple and any label will not be drawn; otherwise, the link's attributes are inherited from the default link attribute type.

At 1913, four more link types are created; linkType1 and linkType2 are created using the link type linkGroup1 and inherit the attributes for links of that type; in addition, each of the new link types specifies a label to be displayed on the link; the link descriptions for the new link types will list only these labels as attributes; the remainder of the attributes will be inherited from the default link type and linkGroup1. link-Type3 and linkType4 are created using linkGroup2 and define no attributes of their own; they thus inherit all of their attributes from the default link type and linkGroup2. As can be seen from the form of links 1107 in FIG. 11, among the attributes inherited from the default link type is the presence of arrowheads on the links and a narrower line thickness than that defined for the links 1105. At 1915, linkType4 is modified by adding an attribute that turns off the arrowhead; the result is links like the link at 1109. Finally, at 1917, the links are created. The link 1105(c) is created with linkType1 and consequently has a wide dark blue line and the label link1; the link 1105(d) has linkType2 and is accordingly the same as link 1105(c) except for the label. The links 1107(e . . . g) are all created with linkType3 and therefore have the attributes inherited from linkGroup2. Link 1109, finally, is created with linkType4, and consequently has no arrowhead. At 1919, node1 is specified as the root node of graph 1101.

In a preferred embodiment, the inheritance techniques just described are used for the attributes of nodes and links; they can, however, be applied to any element of a display for which attributes may be set.

CONCLUSION

The foregoing Detailed description has disclosed to those skilled in the relevant technologies how to make and use the inventions disclosed herein and has further disclosed the best modes presently known to the inventors of practicing the inventions. It will be immediately apparent to those skilled in the relevant technologies that many other implementations of the principles of the inventions disclosed herein are possible. For example, locations other than the ones disclosed herein may be specified for attributes and attributes other than content attributes and action attributes may be associated with locations in and around nodes. The attributes may further have representations other than the ones disclosed herein, as well as different APIs for reading and setting the attributes. The embodiment of the technique for compressing the representation of a node's attributes at rendering time is of course dependent on the manner in which locations are specified and modified versions of the technique would be required for locations specified in other ways.

With regard to inheritance, the inheritance techniques described herein may be applied to any element of a graph, not just to nodes and links, and the manner in which the node types are represented will vary from embodiment to embodiment.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A representation of a node in memory, the memory being accessible to a processor that is executing code that creates a display including the node and the representation comprising:
   a node object representing the node; and
      associated therewith, a set of attribute representations representing attributes, an attribute representation including a specification of a location of a plurality thereof relative to the node when the node is displayed,
   whereby the processor creates the display with the attributes represented by the attribute representations at the specified locations relative to the node, wherein the location specified in the attribute representation is a location inside the node or a location outside the node.

2. The representation set forth in claim 1 wherein:
the code that creates the display provides an interface whereby an attribute representation for a location is set.

3. The representations set forth in claim 1 wherein:
the set of attribute representations includes representations of content attributes, a content attribute representation further including
a specification of a value for the content attribute.

4. The representation set forth in claim 3 wherein:
the code that creates the display provides an interface whereby a value in a content attribute representation for a location is set.

5. The representation set forth in claim 3 wherein the content attribute representation further specifies
a type for the attribute; and
the value is a value of the specified type.

6. The representation set forth in claim 5 wherein:
the code that creates the display provides an interface whereby a type in a content attribute representation for a location is set.

7. The representation set forth in claim 5 wherein:
the type is a label type.

8. The representation set forth in claim 7 wherein:
the type is an image type.

9. The representation set forth in claim 5 wherein:
the type is a glyph type.

10. The representation set forth in claim 5 wherein:
the set of attribute representations further includes representations of action attributes, each action attribute representation specifying an action to be performed in response to user input from a pointing device at the specified location.

11. The representation set forth in claim 10 wherein:
the specified action operates on a value specified in a content attribute for the location.

12. The representation set forth in claim 1 wherein:
the set of attribute representations includes representations of action attributes, each action attribute further including an action to be performed in response to user input from a pointing device at the specified location.

13. The representation set forth in claim 12 wherein:
the code that creates the display provides an interface whereby an action attribute for a location is set.

14. The representation set forth in claim 1 wherein:
the location is specified in terms of a direction relative to the node and whether the location is inside or outside the node.

15. The representation set forth in claim 14 wherein:
the locations of the plurality are predetermined.

16. The representation set forth in claim 1 further comprising:
a representation of a hierarchy of node types that is associated with the node object; and
the attribute representations are associated with the node object either directly or via the representation of the hierarchy of node types.

17. The representation set forth in claim 16 wherein:
the attribute representations are inherited in the hierarchy of node types.

18. The representation set forth in claim 16 wherein:
the root of the hierarchy is a default node type.

19. The representation set forth in claim 16 wherein:
the code that creates the display provides an interface whereby an attribute representation is settable at any level in the hierarchy.

20. A memory device, the memory device being characterized in that:
the memory device has stored thereon the code set forth in claim 1.

21. A method of drawing a node, the method being practiced in a processor that is executing a graph drawing program and that has access to memory wherein is stored a node object representing the node and a set of content attribute representations associated with the node object, each content attribute representation specifying a location relative to the node for the content attribute and a value for the content attribute and the location belonging to a predetermined set thereof, the method comprising the steps performed in a rendering phase of execution of the visualization system of:
making an uncompressed representation of the predetermined set of locations and relating the specified content attribute values to the locations in the uncompressed representation that correspond to the locations specified for the specified values;
making a compressed representation from the uncompressed representation in which unnecessary white space between the specified values is eliminated; and
using the compressed representation to render the node.

22. The method set forth in claim 21 wherein:
in the step of making a compressed representation, the compressed representation eliminates the white space such that the positions relative to each other of the locations whose specified values are non-null remain unchanged.

23. The method set forth in claim 22 wherein:
in the uncompressed representation, each location has a row number and colunm number for a location in a first grid that corresponds to the location's position in the node; and
the compressed representation is a second grid from which rows and columns in the first grid which contain only locations whose specified values are null have been removed.

24. The method set forth in claim 23 further comprising the step of:
giving each element in the second grid a size such that the element's width is the maximum width required to display any specified value belonging to an element in the element's column and the element's height is the maximum height required to display any specified value belonging to an element in the element's row.

25. The method set forth in claim 24 further comprising the step of:
centering the displayed specified value in the rectangle defined by the height and width of the specified value's element.

26. A memory device, the memory device being characterized in that:
the memory device has stored thereon code which, when executed, performs the method set forth in claim 21.

27. A representation of a set of attributes that are applicable to an element of a graph drawn by a processor that executes code for displaying the graph, the representation of the set of attributes being in memory accessible to the processor and comprising:

an element type associated with the element, the element type belonging to a hierarchy thereof; and representations of attributes belonging to the set that are associated with the element types of the hierarchy, wherein the root of the hierarchy is a default element type for which a complete set of the attributes applicable to the element has been defined, and an attribute which has been set by a representation at a given level in the hierarchy overrides an attribute which has been set by a representation at a higher level.

28. The representation set forth in claim 27 further comprising:

a representation of an attribute belonging to the set which is associated with the element rather than with a type of the hierarchy.

29. The representation set forth in claim 27 further comprising:

a representation of an attribute belonging to the set which is associated with the element rather than with a type of the hierarchy, the representation which is associated with the element being at the lowest level of the hierarchy.

30. The representation set forth in claim 29 wherein:

the code for displaying the graph provides an interface whereby an attribute may be set at any level of the hierarchy.

31. The representation set forth in claim 27 wherein:

the code for displaying the graph provides an interface whereby an attribute is settable at any level of the hierarchy.

32. A memory device, the memory device being characterized in that:

the memory device has stored thereon the code set forth in claim 27.

33. A method of obtaining a set of attributes belonging to an element of a graph drawn by a processor that executes code for displaying the graph, the set of attributes having a representation in memory accessible to the processor, the representation including an element type associated with the element, the element type belonging to a hierarchy thereof; and representations of attributes belonging to the set that are associated with the element types of the hierarchy and the method comprising the steps for each level of the hierarchy, beginning at the lowest level of the hierarchy, of:

adding any attribute belonging to the element which was not set at a lower level but is set at the current level to the set of attributes; and when there is a next level of the hierarchy, going to the next level of the hierarchy.

\* \* \* \* \*

UNITED STATES PATENT AND TRADEMARK OFFICE
CERTIFICATE OF CORRECTION

PATENT NO. : 7,456,840 B2                                   Page 1 of 1
APPLICATION NO. : 11/029523
DATED          : November 25, 2008
INVENTOR(S)    : Molesky et al.

It is certified that error appears in the above-identified patent and that said Letters Patent is hereby corrected as shown below:

In column 3, line 40, delete "system." and insert -- system; --, therefor.

In column 6, line 67, delete "627)." and insert -- (627). --, therefor.

In column 7, line 50, delete "S0" and insert -- SO --, therefor.

In column 7, line 50, delete "SEQ" and insert -- SEO --, therefor.

In column 8, line 37, delete "SEQ." and insert -- SEO. --, therefor.

In column 10, line 33, delete "improps." and insert -- imProps. --, therefor.

In column 10, line 39, delete "SEQ" and insert -- SEO --, therefor.

In column 16, line 37, in Claim 23, delete "colunm" and insert -- column --, therefor.

Signed and Sealed this

Twenty-seventh Day of April, 2010

David J. Kappos
*Director of the United States Patent and Trademark Office*